Patented Mar. 14, 1939

2,150,741

UNITED STATES PATENT OFFICE 2,150,741

MANUFACTURE OF PHTHALOCYANINE COLORING MATTERS SOLUBLE IN ORGANIC MEDIA

Archibald Alwyn Harrison and Henry Samuels, Blackley, England, assignors to Imperial Chemical Industries Limited, a corporation of Great Britain No Drawing. Application June 3, 1936, Serial No. 83,402. In Great Britain June 4, 1935

9 Claims. (Cl. 260—314)

This invention relates to the manufacture of phthalocyanine coloring matters soluble in organic solvents. It is an object of this invention to provide new coloring matters which are soluble in organic solvents such as alcohols, acetone, etc. It is a further object of this invention to provide a process for treating water-soluble dyestuffs of the phthalocyanine series in such a manner as to convert them into coloring matters which are soluble in organic solvents. Other and further important objects of this invention will appear as the description proceeds.

In British Patent Nos. 271,580 and 277,371 (or in U. S. Patent No. 1,674,128) are described methods of producing coloring compounds soluble in organic solvents by converting dyestuffs containing acid groups into salts of organic bases. As bases for this purpose have been designated a few special types, mainly ureas and guanidines, especially di- and tri-aryl-guanidines.

We have now found that excellent, and in most cases superior, results may be obtained if one selects as base an organic compound containing a long-chain alkyl group, say an aliphatic open chain of not less than 8 carbon atoms. Moreover, the base need not be a nitrogenous compound, but may be a compound containing a sulfur or phosphorus atom, or any other atom capable of existing in a higher state of valency and acting as a basic radical. More particularly, according to our invention we may employ as neutralizing agent for the acid dyestuffs, a long-chain aliphatic amine or ammonium compound, a long-chain alkyl-pyridinium compound, a long-chain alkyl-sulfonium compound or phosphonium compound, or any other compound of the "onium" type possessing in its structure an aliphatic chain of from 8 to 20 carbon atoms.

Accordingly, our invention consists of treating an aqueous solution of a dyestuff of the phthalocyanine series containing one or more sulfonic groups with a solution of a quaternary ammonium, phosphonium or ternary sulphonium salt or an amine containing in the molecule an aliphatic or cyclo-aliphatic radical of not less than 8 carbon atoms. By this means we produce colored salts insoluble or only sparingly soluble in water which, however, are soluble in numerous organic solvents, e. g. methylated spirits, acetone, cyclo-hexanol and various alcohols and esters.

As typical members of the bases aforementioned may be cited by way of example, cetyl-pyridinium bromide, cetyl-trimethyl-ammonium bromide, dimethyl-hexadecyl-sulfonium-methyl-sulfate, dimethyl-dodecyl-sulfonium-methyl-sulfate, triethyl-hexadecyl-phosphonium bromide, and triethyl-dodecyl-phosphonium bromide, or any of the long-chain compounds enumerated in U. S. Patent No. 2,090,890 resulting from copending application Serial No. 6,131 by Howard and Wormald, and in copending application of Hannay and Wormald, Serial No. 28,582.

The latter application discloses among others quaternary nitrogenous compounds of the general formula

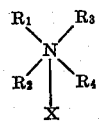

wherein $R_1$, $R_2$, $R_3$ and $R_4$ are alkyl radicals, aralkyl radicals, or aryl radicals, while X is the anion of an acid, for instance a chlorine atom, a sulfuric acid radical, or the anion radical of mono-methyl-sulfuric acid.

In this invention we prefer to use those compounds of the above general formula which contain an aliphatic radical of at least 8 carbon atoms. The preferred compounds may therefore be defined by the general formula

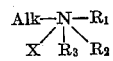

wherein Alk stands for an alkyl hydrocarbon radical having from 8 to 20 carbon atoms, $R_1$, $R_2$ and $R_3$ stand for individual alkyl radicals or designate jointly a cyclic radical, such as pyridine, whereof the carbon atoms are attached to the indicated N atom by the aid of three bonds, while X stands for an acid radical.

As further illustrations of compounds falling within the above general formula, and specifically named in said patent and copending application, may be mentioned:

Dicetyl-dimethyl-ammonium bromide,
octadecyl-trimethyl-ammonium-methyl-sulfate,

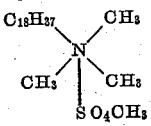

Trimethyl-ammonium-methyl-sulfate-mono-stearyl-ethylene-diamine,

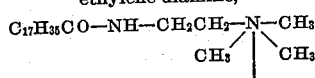

Octadecyl-pyridinium bromide,
cetyl-pyridinium chloride,

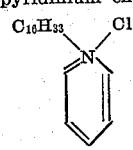

Cetyl ether of N-hydroxymethyl-pyridinium chloride,
oleic-acid-ester of N-hydroxymethyl-pyridinium chloride.

The invention is of particular interest in connection with the production of blue spirit soluble coloring matters from sulphonated phthalocyanines. The term phthalocyanine is a group name (cf. Linstead et al. Journal of the Chemical Society, 1934, 1016–1039). Metal phthalocyanines, or at least, some metal phthalocyanines, have the formula $(C_8H_4N_2)_4Me$ where Me is a divalent metal. The copper and nickel phthalocyanines are of particular interest, and may be sulphonated as described in British specification No. 322,169. Such sulphonation, it will be understood does not necessarily lead to the production of a homogeneous product, i. e. a single chemical compound. Particular homogeneous sulphonic acids may, however, be obtained in other ways. Thus the invention relates also to the use of the tetrasulphonic acids of metal phthalocyanines obtained synthetically, that is, by a process wherein sulphophthalic acids or their anhydrides or their ammonium or alkali salts or their carboxylic amides are caused to interact with metals or metal compounds and with urea or heat-decomposition products of urea, or ammonium sulphophthalates are caused to interact with metals or metallic compounds and aminosulphonic acid, iminodisulphonic acid, or nitrilotrisulphonic acid or the salts of their acids.

Where the dyestuff employed is in free acid form, the base selected need not be in a higher state of valency, for instance an ammonium compound, but the corresponding basic amine may be used instead. The free amine form may also be employed where the dyestuff is in the form of a salt, say in the sodium-sulfonate form, provided an acid, such as hydrochloric, sulfuric or oxalic is added simultaneously.

Without limiting our invention to any particular procedure, the following examples are given to illustrate our preferred mode of operation. Parts mentioned are by weight.

*Example*

10 parts of copper phthalocyanine tetrasulfonic acid as sodium salt, (made for instance by heating 52.6 parts of ammonium-4-sulphophthalate, 30 parts of urea and 6.7 parts of anhydrous cupric chloride at 250° C. until no more coloring matter is formed, then taking up the melt in hot water, filtering off any insoluble material, neutralizing the filtrate with hydrochloric acid and salting out; or, by heating together 10 parts of 4-sulphophthalic sodium salt, 25 parts of ammonium sulphamate and 2 parts of cupric chloride at 220° C. and working up the melt as above mentioned) are dissolved in 1000 parts of water at 70° C. A solution is made of 7 parts of cetyltrimethyl ammonium bromide in 140 parts of water, likewise at 70° C. This solution is added to the dyestuff solution. A deep blue precipitate is immediately formed. The precipitate is filtered off, washed with water and dried.

The blue powder so obtained is readily soluble in ethyl alcohol, or a mixture of ethyl alcohol and glycerol. To the solutions shellac may be added if enhanced brilliancy of the prints is required. The so-obtained solutions form excellent media whereby there may be produced clear brilliant deep blue prints on paper, especially fancy wrapping paper.

Similar results are obtained when less highly sulphonated phthalocyanines are used. For instance the sulphonated phthalocyanines may be made by a direct sulphonation process, using "oleum" (sulphuric acid containing sulphuric anhydride). Such a process is described in British specification No. 322,169 (see especially Example 14).

In place of the aforementioned quaternary ammonium compound, there may be used cetyl-pyridinium bromide, dimethyl-hexadecyl-sulfonium-methyl-sulfate, dimethyl-dodecyl-sulfonium-methyl-sulfate, triethyl-hexadecyl-phosphonium-bromide or triethyl-dodecyl-phosphonium-bromide.

The new coloring matters are useful in those arts wherever a spirit soluble or acetone soluble, etc., color is required, for instance in the manufacture of spirit inks, spirit stains, spirit varnishes, etc.

The new products possess the advantages of definite superiority in fastness to light, or fastness to both light and water over most of the common spirit soluble dyes now on the market, and of superior solubility and tinctorial value over certain other common types of spirit soluble dyestuffs.

We claim:

1. The process of producing an alcohol soluble dyestuff, which comprises reacting a sulfonated phthalocyanine compound with an organic quaternary ammonium compound having an aliphatic radical of from 8 to 20 carbon atoms attached directly to the pentavalent nitrogen atom, and recovering the dyestuff salt thus formed.

2. The process of producing an alcohol soluble dyestuff, which comprises reacting a sulfonated metal phthalocyanine with a compound of the general formula

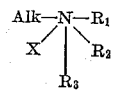

wherein Alk stands for an alkyl hydrocarbon radical having from 8 to 20 carbon atoms, $R_1$, $R_2$ and $R_3$ stand for individual alkyl radicals or designate jointly a cyclic radical, and X stands for an acid radical, and recovering the dyestuff salt thus formed.

3. An alcohol-soluble dyestuff, being a salt of a normally water-soluble compound of the phthalocyanine series and an organic nitrogenous base having at least three of its nitrogen valencies connected to carbon and carrying at least one aliphatic radical of not less than 8 carbon atoms.

4. An ammonium salt of a polysulfonated phthalocyanine compound in which the ammonium radical carries at least 3 alkyl radicals of which at least one contains from 8 to 20 carbon atoms, said compound being characterized by solubility in alcohol.

5. A quaternary ammonium salt of a polysulfonated metal phthalocyanine, in which one of the substituents of the ammonium nitrogen is an alkyl radical of at least 8 carbon atoms.

6. The cetyl-trimethyl-ammonium salt of a polysulfonated copper-phthalocyanine.

7. The cetyl-pyridinium salt of a polysulfonated copper-phthalocyanine.

8. A composition of matter comprising an organic vehicle and an alcohol soluble coloring matter as defined in claim 3.

9. A coloring composition comprising an organic liquid vehicle and a coloring matter as defined in claim 4.

ARCHIBALD ALWYN HARRISON.
HENRY SAMUELS.